3,020,250
AQUEOUS EPOXY RESIN EMULSIONS AND COATINGS THEREFROM
Stanley Norwalk, Springfield, N.J., assignor to Union Carbide Corporation, a corporation of New York
No Drawing. Filed Aug. 4, 1959, Ser. No. 831,498
25 Claims. (Cl. 260—7)

This invention relates to aqueous emulsions of epoxy resins and coatings and binders made therefrom. More particularly, the invention relates to highly stable aqueous emulsions of epoxy resin useful for the production of epoxy resin coatings and binders characterized by a high degree of water resistance and excellent adhesive properties.

As used throughout the present specification and claims, the term "emulsion" is intended to mean a heterogeneous dispersion of a liquid in a dissimilar liquid. One liquid is discontinuous and dispersed, existing as separated globules and is hereinafter referred to as the dispersed phase; the other liquid is continuous, i.e., each portion thereof is in contact with all other portions thereof, and is disposed about the globules of the dispersed phase, and is hereinafter referred to as the continuous phase. To "emulsify" a liquid is to disperse it throughout a continuous phase formed from an "emulsificant."

Epoxy resins have been widely used as binders, coatings, impregnants and adhesives; characteristic properties such as toughness and tenacious adhesiveness make epoxy resins especially suitable for these applications.

Difficulty has been experienced in the art, however, in achieving a completely satisfactory method of applying epoxy resins to the various porous, semi-porous, solid and matted fibrous substrates with which these resins are commonly used. In a widely practiced method, a solution of epoxy resin in an organic solvent is applied to the substrate and heated to drive off the solvent and cure the resin. Although with this technique a considerable degree of control over the viscosity of the solution to be applied and the non-volatiles content in the coating or binder composition is possible, production problems have made the "solution method" undesirable. The production problems are, obviously, those commonly associated with the use of costly, toxic, flammable, highly volatile organic liquids. In another widely practiced method, liquid epoxy resin is employed without the use of any solvent whatever. This method, too, is undesirable from a production standpoint. For example, the high viscosity of liquid resin makes it inconvenient to pump and spray; attempts to form thin films from liquid resin in inhomogeneous films having fisheyes and similar defects; and further the molecular weight of the resin cannot be controllably advanced in the pot prior to application because of the buildup of an exothermic condition termed a "mass effect" upon heating therein.

It has been suggested, in order to avoid the disadvantages of organic solvent/epoxy resin solutions, to substitute emulsions of epoxy resins in water. Aqueous emulsion-like solutions offer a high degree of control over the viscosity of the epoxy resin coating during application. Additionally, aqueous emulsions of epoxy resins permit controllable B-staging of the epoxy resin by eliminating the "mass effect" associated with liquid epoxy resin.

Heretofore, however, it has been necessary to employ in all known aqueous emulsions some amount of an organic solvent or wetting agent or both. The presence of these additives has been required to ensure the obtaining of a stable emulsion, i.e., an emulsion that will not revert to two phases upon standing.

Thus, the use of aqueous epoxy resin emulsions has been limited by the lack of suitable formulations.

Aqueous emulsions employing organic solvents are patently subject to all the drawbacks and disadvantages usually associated with use of organic solvents, albeit in a somewhat lessened degree.

Aqueous emulsions employing wetting agents such as partial esters of polyhydric alcohols and saturated and unsaturated fatty acids are stable but products obtained therefrom are seriously deficient in many properties. For example, the use of wetting agents in epoxy resin emulsions deleteriously affects water resistance and adhesive strength in cured coatings and like structures produced from such emulsions. Wetting agents are, of course, water soluble. The effect on water resistance is manifested by the appearance of blushes and spotting when the coating is exposed to humid environment. Also, the effect on the normally excellent adhesive properties of epoxy resins in surprisingly great. It is thought that the wetting agents (also referred to as emulsifying agents) which are sometimes not compatible or generally reactive with the resin system and have a tendency to move to the surface of the cured resin, limit the amount of contact between the resin and the coated surface and thus prevent the development of a satisfactory bond. Wetting agents deleteriously affect adhesion of emulsion film because the molecules of the wetting agent are adsorbed in an oriented fashion onto the substrate surface, thereby lowering the surface free-energy at the film-substrate interface and lowering the magnitude of the adhesive forces.

Heretofore then, the use of water as an emulsificant has necessitated a sacrifice in performance characteristics of the cured epoxy resin obtained, notably in water resistance and the degree of adhesion achieved.

It has been known, heretofore, to stabilize emulsions comprising a non-water soluble entity generally termed an "oil" and water by the use of naturally occurring high polymers such as proteins, colloids such as gum arabic and sodium alginate, and synthetic high polymers such as polyethylene glycol and polyvinyl alcohol. These materials are not soluble in water due to their great molecular weight, but do form "colloidal dispersions" in water. These stabilizers are generically termed "protective colloids" and serve to prevent globules of material in the dispersed phase from coalescing by surrounding individual globules with a protective barrier.

All the protective colloids useful as stabilizers for oil/water emulsions are water-dispersible, i.e., will form colloidal dispersions in water. Coatings and other cured forms of epoxy resin produced from known protective colloid-containing stabilized aqueous emulsions contain a water-dispersible component which of course, decreases water resistance in proportion to the amount thereof present. Water resistance is critical in most epoxy resin applications. This deficiency in presently known formulations of epoxy resin emulsions has prevented the achieving of completely adequate epoxy resin products therefrom.

In sum, hitherto known aqueous emulsions of epoxy resin have contained one or more of: (1) organic solvents; (2) wetting agents; and (3) protective colloids, which have decreased their desirability in processing and their acceptability in final properties.

It is an object of my invention, therefore, to overcome deficiencies in hitherto known epoxy resin emulsions. Another object is to provide an epoxy resin emulsion free of wetting agents. Another object is to provide aqueous epoxy resin emulsions employing a protective colloid but yielding a cured epoxy resin of increased water resistance over hitherto known emulsions. Another object is to provide cured epoxy resins exhibiting improved adhesive and water resistant properties. Another object is to provide an epoxy resin composition with superior properties at lower cost. Another object is to provide a new hardener for epoxy resins. Another object is to provide an improved method for obtaining epoxy resin articles.

I have now found that these and other objects are achieved in accordance with my invention by the use of an aqueous epoxy resin emulsion comprising a liquid epoxy resin phase, a water phase and a water-dispersible protein as a protective colloid; and thereafter combining this emulsion with a hardener for the epoxy resin and then with a sufficient amount of a water soluble methylol-group containing compound which is reactive through methylol groups thereon with the water-dispersible protein to insolubilize the water-dispersible protein, thereby forming a mixture which cures to a strongly adhesive, highly water and solvent resistant epoxy resin product.

In general, the method of my invention is carried out by first mixing the water with the water-dispersible protein, with or without the use of a gel depressant as a processing aid, then adding the liquid epoxy resin, preferably slowly and with agitation. Prior to use, I add a hardener for the epoxy resin and then the water soluble methylol-group containing protein insolubilizing compound. After application, I cure the mixture so formed. I have discovered that during cure, simultaneously with the cross-linking reaction of the epoxy resin molecules, the methylol-group-containing protein insolubilizing compound reacts with the highly reactive groups on the water-dispersed protein employed as a protective colloid and effectively insolubilizes it, i.e., renders the protein insensitive to water, or non-water-dispersible. By the desensitization of the protective colloid, I eliminate one of the major drawbacks to the use of aqueous epoxy resin emulsions. By avoiding the use of wetting agents, I obviate the other major drawback to these emulsions and provide for the first time an easily processable epoxy resin emulsion yielding epoxy products of superior properties.

Preferred of the epoxy resins useful in my invention are the polyglycidyl ethers of polyhydric phenols, although other epoxy resins having an epoxy equivalency greater than 1 can also be used. Among the suitable di- and polynuclear phenols suitable for preparation of useful polyglycidyl ethers in my invention are the bisphenols described by Bender et al. in U.S. Patent No. 2,506,486 and polyphenols such as the novolac condensation product of a phenol and a saturated or unsaturated aldehyde containing on an average of from 3 to 20 or more phenylol groups per molecule (cf. book by T. S. Carswell entitled "Phenoplasts," published in 1947 by Interscience Publishers of New York). Examples of suitable polyphenols derived from a phenol and an unsaturated aldehyde, such as acrolein, are the triphenylols, pentaphenylols and heptaphenylols described in U.S. Patent No. 2,801,989 and U.S. Patent No. 2,885,385, both by A. G. Farnham.

Generally, these polyglycidyl ethers of polyhydric phenols are prepared by the reaction of an epihalohydrin with a polyhydric phenol under basic conditions. The polyhydric phenol can be mononuclear such as resorcinal or hydroquinone, or may be di- or polynuclear.

The polyhydric polynuclear phenols can consist of 2 or more phenols connected by such groups as methylene, alkylene, ether, ketone or sulfone. The connecting groups are further exemplified by the following compounds: bis(p-hydroxyphenyl) ether, bis(p-hydroxyphenyl) ketone, bis(p-hydroxyphenyl) methane, bis(p-hydroxyphenyl) dimethyl methane, bis(p-hydroxyphenyl) sulfone, or trisphenol or tetraphenol having the formulas:

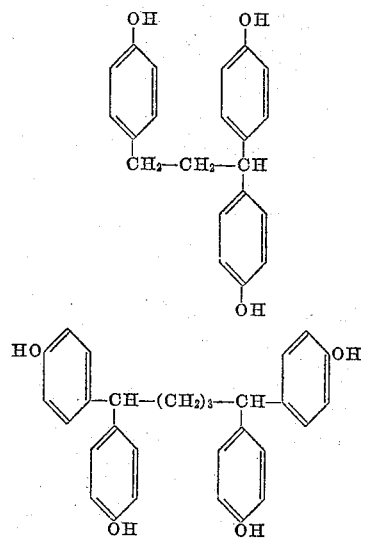

Preferred as the epihalohydrin for reaction with the above polyhydric phenols is epichlorohydrin or glycerol dichlorohydrin.

Other suitable epoxy resins include the polyepoxides, i.e., organic monomeric or polymeric compounds having an epoxy equivalent greater than 1, and a minimum of two and suitably three or four and more epoxy groups, i.e.,

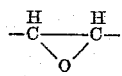

per molecule. The compounds can be saturated, unsaturated, aliphatic, cycloaliphatic, aromatic, or heterocyclic and can be unsubstituted or substituted with, for example, hydroxyl groups, halogen atoms, ether radicals and the like. The polyepoxides useful in my invention have epoxy equivalent numbers, as defined in U.S. Patent 2,633,458, of at least 1.0.

Among the suitable polyepoxides are the epoxy polyethers of polyhydric phenols obtained by reacting a polyhydric phenol with a halogen-containing epoxide in an alkaline medium. Suitable for example, are the polyethers obtained by reacting an excess of epichlorohydrin with 2,2-bis(4-hydroxyphenyl) propane (to obtain 2,2-bis(2,3-epoxypropoxyphenyl) propane), resorcinol, catechol, hydroquinone, methyl resorcinol, polynuclear phenols such as 2,2-bis(4-hydroxyphenol) butane, 4,4'-dihydroxybenzophenone, bis(4-hydroxphenyl) ethane, 2,2-bis(4-hydroxyphenyl) pentane, and 1,5-dihydroxynaphthalene. Other halogen-containing epoxides are 3-chloro-1,2-epoxybutane, 3-bromo-1,3-epoxyhexane, 3-chloro-1,2-epoxyoctane, and the like.

Preferred polyepoxides are the glycidyl polyethers of dihydric phenols obtained by reacting epichlorohydrin and a dihydric phenol in an alkaline medium. The polymeric product is generally not a single simple molecule but a mixture of glycidyl polyethers having the general formula

wherein R is a divalent hydrocarbon radical of the dihydric phenol and $n$ is an integer of the series 0, 1, 2, 3, etc. The integer $n$ for the obtained mixture of polyethers is not necessarily zero or a whole number, but for any single molecule of the polyether, $n$ is an integer.

I particularly prefer as the epoxy resins the diglycidyl ether of dihydroxy diphenyl propane, the diglycidyl ether of dihydroxy diphenyl methane, the polyglycidyl ether of a 6-7 ring (average) phenol-formaldehyde novolac and the diglycidyl polyether of dihydroxy diphenyl propane.

The above polyglycidyl ethers of polyhydric phenols are added slowly to a colloidal dispersion of a water dispersible protein, suitably in the presence of a compound which inhibits the formation of gels, i.e., a gel depressant.

I have found that there is sometimes a tendency for the dispersed protein to form a soft gel. This gel consists of large molecules held to one another by intermolecular forces, generally termed secondary valence forces. These forces are inversely proportional to a high power of the distance between the molecules and hence operate only at very short distances and then only weakly. To prevent the formations of these reversible gels, I employ a conventional processing aid such as thiourea, dicyandiamide, calcium chloride, ammonium nitrate and similar gel inhibitors or gel depressants.

The proteins useful in my invention are water dispersible proteinaceous substances. These act as protective colloids in the liquid epoxy resin/water emulsion. By the term "water-dispersible" is meant the ability to form inherently stable colloids with water. These water-dispersible proteins are readily adsorbed onto the surface of the epoxy resin globules. The surfaces of the globules then have the properties of the adsorbed stable colloid. A stable system of liquid epoxy resin globules each enclosed by adsorbed protein dispersed in water is thus obtained.

Suitable as the water-dispersible protein are fish glues derived from cod fish skin, such as are sold as a 50 percent aqueous solution by Lepages as #181 Fish Glue, casein (milk protein) such as is sold by Borden's as Cascoloid ST 52 and Casex 45 sold by Apex. Soya bean protein is also suitable.

I prefer, as the protective colloid, natural proteins of animal origin. These animal proteins are insoluble in organic solvents and are generically termed albuminoids or sceleroproteins. Included under these latter terms are elastins derived from ligaments, keratins derived from horns, hooves, feathers, quills, and the like, and collagens dervied from tendons, bones and hides. I particularly prefer collagens as protective colloids.

Particularly desirable commercially available animal proteins are the following, listed by their trade names:

|  | Origin | Gel Strength,[1] gms. |
|---|---|---|
| Peter Cooper's S-1½ | Hide | 135 |
| Peter Cooper's S-1¼ | Hide | 192 |
| Peter Cooper's #180TG | Chromed Hides | 135 |
| Armour's #1993 (Driflex 52B) | Hides | 15 |
| Armour's Armoglu #65 | Chromed Hides | [2] 0 |
| Cudhay's Rex | Bones | [2] 0 |
| Consolidated Chemicals—Consol | Bones | 0 |

[1] "Gel strength" of a protein is a number corresponding to the quantity of force needed to drive a 0.5 inch diameter plunger a distance of 4 mm. into a gelled solution containing 12.5% glue solids which has been conditioned 16 to 18 hours at 10° C. [cf. Industrial Engineering Chemistry 16 310-315 (1924); Anal. Ed., vol. 2 348-351 (1930)].
[2] Sold as a 50% aqueous solution containing a gel depressant.

The addition of the liquid epoxy resin to the water/protein dispersion is accomplished slowly and preferably with severe shearing agitation such as is achieved in a Cowles Dissolver. Formation of the emulsion is manifested by the mixture appearing to be a thick white paste. The white color is due to light being reflected from all the interfaces of the emulsified liquid epoxy in all directions.

I prefer to first form a paste of the liquid epoxy resin and the water-containing, colloidally dispersed protein having suitably about 17.5% by weight of water. Other amounts of water, as little as 10% or less by weight, on the lower end and infinite dilution on the higher end are also suitable. Additional water is added later to bring the emulsion to a convenient viscosity. I have found a 50% water by weight emulsion has a useful viscosity of about 500 centipoises.

It is within the scope of my invention to employ solid, epoxy resin as a starting material. To form an emulsion the solid epoxy resin is liquefied by heating and added to water heated hot enough, generally about 140° F., to avoid cooling the epoxy resin, maintaining it in a liquid state from which it is emulsified as outlined above.

The proportion of protein to epoxy resin which will provide a stable aqueous emulsion of the epoxy resin is not narrowly critical. Emulsions having a protein/epoxy resin parts by weight ratio of 0.19:1 have sufficient stability to be useful, if used immediately after preparation. Emulsions having a protein/epoxy resin ratio of 0.23:1 and above are stable for all purposes. There is no apparent maximum ratio of protein to epoxy resin and emulsions having a ratio of 10:1 and more have been successfully prepared. It is to be emphasized that other factors may have an influence on the choice of the most desirable protein/epoxy resin ratio. Thus, while the use of special techniques and formulations would enable the formation of emulsions having a protein/epoxy resin ratio of less than 0.19:1, such a course is not ordinarily economically practicable. Also, considerably greater quantities of protein than 10 parts by weight to each part by weight of epoxy resin can be used, but the resulting formulations are reduced in water resistance and not practically useful. I prefer emulsions having a protein/epoxy resin ratio of from about 0.23:1 to 2:1.

It is not essential in the emulsions hereinabove described that the liquid epoxy resin form the dispersed phase and water the continuous phase. Reversing the phases (inverting the emulsion), making the water phase dispersed and the liquid epoxy resin phase continuous does not affect the usefulness of the coatings and binders obtained from such emulsions, although their properties differ from non-inverted emulsions. The protective colloid is also employed in the inverted emulsions.

The emulsions prepared in accordance with my invention are stable, i.e., undergo no phase separation for periods of from two weeks to three months and longer, and hence, provide considerable processing advantages over prior art organic and aqueous epoxy resin emulsions, some of which remain stable for only five or six hours.

To convert the above-described emulsions to strongly adhesive, water resistant coatings and binders, I add an epoxy resin hardener and a water-soluble methylol-containing compound which is heat-reactive with the protein dispersed in the water phase.

The function of the hardener or curing agent is to cross-link the liquid epoxy resin or to cause the liquid epoxy resin to cross-link or thermoset. In the former case the hardener is said to be of the co-reactant type, in the latter case of the catalyst type. Hardeners of the catalyst type are characterized by the absence of active hydrogens or less than one active hydrogen per epoxy group present; those of the coreactant type are characterized by a minimum amino-hydrogen functionality of greater than two. Many different hardeners are known to the art. In general, any hardener heretofore used to cross-link or to cause to cross-link epoxy resins can be used in the same capacity with the emulsion borne epoxy resins of my invention. The amounts of such hardeners for a particular epoxy resin necessary to achieve a particular result, e.g., a certain rate of cure, will be obvious to those in the art experienced in formulating epoxy resin compositions.

Examples of suitable conventional amine epoxy resin hardeners of the catalyst type are: α-methyl benzyl dimethyl amine, a water insoluble liquid; dimethyl ethanolamine, a water soluble liquid; boron trifluoride-monoethylamine complex, a water soluble solid.

Examples of suitable conventional amine epoxy resin hardeners of the co-reactant type are: hydroxy ethyl diethylene triamine, diethylene triamine, water soluble liquids; 2,2′ bis(4-hydroxy phenyl) propane mixed with hydroxy ethyl diethylene triamine, a partially water soluble liquid; epoxy modified alkylamines, water insoluble liquids; meta-phenylene diamine and hexamethylene tetramine, water soluble solids.

Other suitable amine hardeners include: ethylene diamine, triethylene tetramine, dicyandiamide, melamine, pyridine, cyclohexylamine, benzyldimethylamine, benzylamine, diethylaniline, triethanolamine, piperidine, tetramethyl piperazine, N,N-dibutyl-1,3-propane diamine, N,N-diethyl-1,3-propane diamine, 1,2-diamino-2-methyl propane, 2,7-diamino-2,6-dimethyloctane, dibutylamine, dioctylamine, dinonylamine, distearylamine, diallylamine, o-tolylnaphthylamine, pyrrolidine, 2-methylpyrrolidine, tetrahydropiperidine, 2-methylpiperidine, diaminopyridine, tetramethyl pentamine and the like, and salts of these amines.

The minimum amount of epoxy co-reactant which can be successfully employed in the emulsions of my invention is determined by the necessity of avoiding curdling of the emulsion, i.e., coagulation of the methylol-containing compound with the protein in the emulsion. The use of gel depressants as mentioned above inhibits the gelling tendencies of the methylol-containing compound and protein. The presence of the various amine hardeners has a similar beneficial effect on the stability of the emulsion and prevents formation of gels upon the addition of the methylol-containing compound to the colloidal dispersion of protein. At least 1% of an amine compound, present either as a gel depressant per se or as a hardener and only incidentally as a gel depressant, must be present before methylol-containing compounds are added to the colloidally dispersed protein, unless an acid is used as the hardener or curing agent, as explained hereinbelow. The amount of amine co-reactant is not narrowly critical, but preferably is sufficient to provide approximately one active hydrogen per oxirane oxygen.

It is evident from the above partial list of suitable amine hardeners that both water soluble and water insoluble amines can be used. In emulsions where water forms the continuous phase, the water soluble amines are dissolved thereinto. In the case of water insoluble amines, the compounds are either mixed with the epoxy resin prior to emulsification of the resin or are themselves emulsified in water and added to the continuous water phase. In inverted emulsions the amine is dissolved in the continuous (epoxy resin) phase.

In addition to the amine hardeners disclosed above, other types of hardeners can be used in my composition, namely, acids and, novelly with this disclosure, urea.

Acid-acting hardeners or curing agents useful in my invention include: inorganic acids such as phosphoric acid, boric acid, sulfonic acid, phosphonic acid, perchloric acid, persulfuric acid, and the anhydrides thereof; Lewis acids such as salts of inorganic acids, for example, zinc fluoborate, magnesium fluoborate, magnesium perchlorate, potassium persulfate, copper fluoborate, copper persulfate, cobaltic fluoborate, chromic nitrate, magnesium nitrate, calcium phosphite and the like; organic acids and anhydrides such as citric acid, acetic acid, acetic acid anhydride, butyric acid, caproic acid, phthalic acid, phthalic acid anhydride, tartaric acid, aconitic acid, oxalic acid, succinic acid anhydride, lactic acid, maleic acid, maleic acid anhydride, fumaric acid, glutaconic acid, 1,2,4-butanetricarboxylic acid, isophthalic acid, terephthalic acid, malonic acid, 1,1,5-pentanetricarboxylic acid, acetoacetic acid, naphthalic acid, and trimellitic acid.

Preferred are the di- and polycarboxylic water soluble, low molecular weight saturated or unsaturated acids such as malonic acid, maleic acid and citric acid. The use of the aforementioned acids as hardeners for epoxy resins has not been widely accepted heretofore.

The reason was that these acids react with the secondary hydroxyl groups formed on the opening of the oxirane ring and give off water, which causes bubbles and other defects in the finished product. This problem has heretofore been overcome with conventional epoxy resins through the use of the anhydrides of the acids. With emulsified epoxy resins, however, the acids per se can be used without causing defects.

I have now discovered that in addition to the above, conventional epoxy resin hardeners, urea heretofore not used as an epoxy resin hardener, can be used as an epoxy resin hardener in the epoxy resin emulsions herein described.

Urea is quite soluble in water and insoluble in epoxy resins. It is believed that the behavior of urea as a hardening agent is not due to a reaction between the oxirane rings of the epoxy resins and the amido groups of urea, but rather to the decomposition of urea to ammonia or similar intermediate which is reactive with epoxy groups. Hence, urea performs best under alkaline conditions. Use of urea in conjunction with sodium hydroxide in an emulsion having a pH of about 8.5 results in accelerated urea decomposition and lighter cured films. Suitable amounts of urea to achieve satisfactory rates of hardening are from about 3 to 25 parts by weight of urea per 100 parts of an emulsion containing 50% epoxy resin. Combinations of urea with conventional epoxy resin hardeners are highly desirable. Emulsion containing only urea and methylol-containing compound as hardeners, i.e., no amine, is stable (no gellation) for up to six weeks in contrast to but two to three days for conventional amine hardener systems. Another advantage of the use of urea as a hardener is that raw material costs for the emulsion are thereby lowered.

The water soluble methylol-containing compounds used to insolubilize the protein, i.e., render the protein insensitive to and non-dispersible in water, useful in my invention include 2,4,6-tris(hydroxymethyl) phenol, phenol formaldehyde resoles, e.g., the resole prepared with 2.8 moles of formaldehyde per mole of phenol, phenol formaldehyde resin prepared with one mole of formaldehyde per mole of phenol and other phenolic resins; dimethylol ureas, dimethylol melamine, trimethylol melamine and other melamines; acetone-formaldehyde resin; and dimethyl hydantoinformaldehyde resin. The criterion for suitable insensitizing agents is the presence of at least one methylol group (distinguished from an alcoholic hydroxyl by its reactivity with the ortho and para hydrogens of phenol) and water miscibility or solubility. The reaction between the methylol-containing compound and the protein is essentially a cross-linking which ties together the protein chains in a netlike structure until they are no longer water-dispersible or able to form colloidal dispersions in water. As a minimum, sufficient methylol-containing compound must be added to the emulsion to insolubilize the protein present therein during cure of the epoxy resin. Generally, about 25 parts by weight solids of methylol-containing compound per 100 parts by weight solids of protein, is the lowest amount at which the water resistance is noticeably improved over non-insolubilized protein-containing epoxy resins. There is no critical maximum amount of methylol-containing compound with respect to the protein but above 400 parts by weight solids of methylol-containing compound per 100 parts by weight solids of protein usually reduces the flexibility and adhesion otherwise characteristically obtained from the emulsions of my invention.

Conventional fillers and pigments can be added to the compositions of my invention as with other epoxy resin compositions heretofore known.

The following examples are presented to illustrate my invention.

EXAMPLES 1–10

Ten epoxy resin emulsions were prepared as follows:

The gel depressant if any, was added to the water followed by the protein. Some of the water was heated in examples using solid epoxy resins with the resin melted. The liquid epoxy resin was slowly added to the water under severe shearing agitation obtained by rotating a bladed impeller of a Cowles Dissolver at a high speed. A thick white paste formed and sufficient water was added to bring the non-volatiles content, epoxy resin, thiourea and protein, to 50% by weight. The resulting emulsion was a low viscosity milk-liquid. The amine hardeners and methylol-containing compound were added in that order, just prior to use of the emulsion. Each of the ten emulsions was applied as a coating onto steel and/or glass panels. Each dried to water resistant films which adhered strongly to the substrate which could be scraped only with difficulty using sharply pointed instruments. The film covered panels were immersed in room temperature water and observed for signs of blushing, softening, blistering, etc. Each of the films proved completely satisfactory.

I

Ingredients: Parts by weight
- Epoxy resin—Diglycidyl ether of dihydroxy diphenyl propane _____ 39.39
- Protein—Animal glue (135 gm. gel str.) ____ 9.55
- Hardener—Diethylene triamine _____ 4
- Insolubilizer—2.8:1 formaldehyde-phenol resole _____ 15
- Other—
  - Thiourea as a gel depressant _____ 1.06
  - Water _____ 50

II

Ingredients:
- Epoxy resin—High molecular weight diglycidyl polyether of dihydroxy diphenyl propane @ 110° C. _____ 65
- Protein—Le Page's #181 fish glue @ 90° C. (50% aq. soln.) _____ 35
- Hardener—Diethylene triamine _____ [1] 2
- Insolubilizer—
  - 2,4,6 tris(hydroxymethyl) phenol (70% aq. soln.) _____ [1] 2
  - Water @ 80° C. _____ 65

[1] Per 50 parts emulsion.

III

Ingredients:
- Epoxy resin—Diglycidyl ether of dihydroxy diphenyl propane _____ 40
- Protein—Le Page's #181 fish glue (50% ag. soln.) _____ 20
- Hardener—Diethylene triamine _____ 4
- Insolubilizer—
  - 2,4,6 tris(hydroxymethyl) phenol (70% aq. soln.) _____ 4
  - Water _____ 40

IV

Ingredients:
- Epoxy resin—Diglycidyl ether of dihydroxy diphenyl propane _____ 65
- Protein—Cascoloid ST 52 Casein _____ 35
- Hardener—Diethylene triamine _____ [1] 4
- Insolubilizer—
  - 2.8:1 formaldehyde-phenyl resole _____ [1] 10
  - Water _____ 65

[1] Per 100 parts emulsion.

V [1]

Ingredients:
- Epoxy resin—Diglycidyl ether of dihydroxy diphenyl propane _____ 65
- Protein—Le Page's #35 fish glue _____ 17.5
- Water _____ 17.5
- Hardener—Epoxy modified alkylamine-water insoluble liquid [2] _____ 13
- Insolubilizer — 2,4,6 tris(hydroxymethyl) phenol _____ 16.5
- Other—
  - Cab-O-Gel silica _____ 5
  - Portland cement _____ 90

[1] Epoxy was continuous phase. Fillers made emulsion a troweling compound in which epoxy resin portion hardened at room temperature overnight.
[2] Low molecular weight alkylamine epoxy resin reaction product of diglycidyl ether of dihydroxy diphenyl propane, diethylene triamine and dihydroxy diphenyl propane.

VI

Ingredients: Parts by weight
- Epoxy resin—Diglycidyl ether of dihydroxy diphenyl propane _____ 65
- Protein—Peter Cooper #180 TG animal glue _____ 15.75
- Hardener—Citric acid and dimethyl ethanolamine (13.3 to 0.2 ratio) _____ [1] 13.5
- Insolubilizer—2.8:1 formaldehyde-phenol resole _____ 10
- Other—
  - Thiourea _____ 1.75
  - Water _____ 82.5

[1] Per 100 parts emulsion.

VII

Ingredients:
- Epoxy resin—Diglycidyl ether of dihydroxy diphenyl propane _____ 65
- Protein—Peter Cooper #180 TG animal glue _ 15.75
- Hardener—Urea (50% aq. soln.) _____ [1] 30
- Insolubilizer—2.8:1 formaldehyde-phenol resole _____ 10
- Other—
  - 25% NaOH to adjust pH to 8.9.
  - Water _____ 82.5

[1] Per 100 parts emulsion.

VIII

Ingredients:
- Epoxy resin—Diglycidyl ether of dihydroxy diphenyl propane _____ 65
- Protein—Peter Cooper S-1½ animal glue ___ 15.75
- Hardener—Diethylene triamine _____ [1] 4
- Insolubilizer—1:1 phenol-formaldehyde resin_ [1] 10
- Other—
  - Thiourea _____ 1.75
  - Water _____ 82.5

[1] Per 100 parts emulsion.

IX

Ingredients:
- Epoxy resin—Diglycidyl ether of dihydroxy diphenyl propane _____ 65
- Protein—Peter Cooper S-1½ animal glue ___ 15.75
- Hardener—Diethylene triamine _____ [1] 4
- Insolubilizer—Dimethylol melamine _____ [1] 10
- Water _____ 0

[1] Per 100 parts emulsion.

X

Ingredients:
- Epoxy resin—Diglycidyl ether of dihydroxy diphenyl propane _____ 65
- Protein—Peter Cooper S-1½ animal glue ___ 15.75
- Hardener—Diethylene triamine _____ [1] 4
- Insolubilizer—Dimethylol urea _____ [1] 10
- Other—
  - Thiourea _____ 1.75
  - Water _____ 82.5

[1] Per 100 parts emulsion.

The following Example (XI) illustrates the formulation of a useful emulsion from a polyglycidyl ether of a 6-7 ring (average) phenol-formaldehyde novolac.

XI

Ingredients: Parts by weight
- Epoxy resin—Polyglycidyl ether of 6-7 ring (average) phenol-formaldehyde novolac @ 140° C. — 65
- Protein—Le Page's #181 fish glue @ 90° C. (50% aq. soln.) — 35
- Hardener—none — 0
- Water @ 80° C. — 65

The following example illustrates formation of an epoxy resin emulsion and subsequent addition of insolubilizer and amine hardener.

XII

Ingredients: Parts by weight
- Epoxy resin—Diglycidyl ether of dihydroxy diphenyl propane — 65
- Protein—Le Page's #181 fish glue — 35
- Hardener—m-Phenylene diamine (50% aq. soln.) — 48 [1]
- Other—Water — 65

[1] Per 500 parts of emulsion.

Prior to use, the following were added to the above emulsion which had been heated to 79–81° F. for 60 minutes: ½ gram m-phenylene diamine per 25 parts emulsion and 1 gram 2.8:1 formaldehyde to phenol resole per 25 parts emulsion.

Films made from the above formulation were air dried and found to be non-tacky.

COMPARISON OF PRIOR ART FORMULATIONS

An emulsion was formed containing a wetting agent and a water soluble protective colloid. To 50 parts diglycidyl ether of dihydroxy diphenyl propane were added 10 parts Tween 40 (polyethylene glycol ether of sorbitol monopalmitate). The two were mixed together and heated to 100° C. To the mixture were added 50 parts of a 5% aqueous solution Elvanol 52–22 (a mixture of polyvinyl alcohol and 86–89% hydrolyzed polyvinyl acetate). Warm water was added slowly until the emulsion inverted to an oil/water emulsion (epoxy resin as the dispersed phase). Additional water was then added until the total weight of the emulsion was 500 grams or a 10% epoxy resin emulsion.

Two different hardeners were used:
(1) 0.75 part zinc fluoborate per 100 parts emulsion; and
(2) 1 part diethylene triamine per 100 parts emulsion.

Two thin, wet films were put down on glass panels and cured for 30 minutes at 150° C. Both of the films exhibited poor film-forming properties, notably a lack of ability to form a smooth, continuous film. The films formed were easily scratched. After soaking overnight in room temperature water, the film was easily removable from the glass substrate.

To contrast results obtained and to heighten the significance of my discovery, film made from the formulation of Example I was tested in a similar manner. First, continuous film was easily formed from the composition of my invention. The film was impossible to scratch with fingernails and only difficultly marred with sharp instruments. The film was completely unaffected by an overnight soaking in room temperature water.

NON-INSOLUBILIZED PROTEIN-CONTAINING EPOXY RESIN EMULSIONS

Ingredients: Parts by weight
- Epoxy resin—Diglycidyl ether of dihydroxy diphenyl propane — 65
- Protein—Armorglu 65 (50% aq. soln.) — 35
- Hardener—1,3α-methyl benzyl dimethyl amine — 70
- Other—Water — 65

The above composition was made into a film on a hard non-porous substrate. The film blushed immediately on immersion in room temperature water, showing poor water resistance, and had poor adhesion, wet or dry.

Films were put down on metal panels (1) from the composition given in Example I, (2) from an epoxy resin solution comprising 100 parts of the diglycidyl ether of dihydroxy diphenyl propane, hardened with 25 parts reaction product of diethylene triamine and dihydroxy diphenyl propane and (3) a high formaldehyde-to-phenol resole.

All films were prepared with a 1½ mil Bird applicator and contained equal amounts of non-volatile solids. The films were air dried and then cured for 30 min. at 300° F. The tests were of 28 hour duration unless otherwise indicated.

To most graphically illustrate comparative performance the film which best survived the test was given the number 1. The other films were designated 1, 2, 3, 4 or at worst, 5, depending on how close they were to the best performing film in a given test. To accurately interpret the results, the table below should be read horizontally, not vertically.

It is to be noted that the coatings of my invention are demonstrated to be surprisingly superior in both water resistance and solvent resistance. In fact, coatings made in accordance with this invention are superior to generally all known epoxy resins in solvent resistance and, moreover, at least equivalent in water resistance. The combination of these properties, particularly to such a high degree, has not been achieved heretofore.

*Table*

|  | Aqueous Epoxy Resin Emulsion | Epoxy Solution | Resole |
|---|---|---|---|
| 160" Lb. Gardner Impact | 1 | 1 | 5 |
| "Toughness" (scratch) | 1 | 1 | 5 |
| Film Forming Properties | 1 | 3 | 4 |
| Color | 3 | 1 | 4 |
| Acetone Resistance | 1 | 4 | 4 |
| Water Resistance 6 hr | 1 | 1 | 1 |
| Water Resistance 28 hr | 1 | 1 | 4 |
| Benzene Resistance | 1 | 4 | 4 |
| Perchloroethylene resistance | 1 | 4 | 4 |
| Mineral Spirits resistance | 1 | 3 | 4 |
| 10% H₂SO₄ resistance | 2 | 1 | 5 |
| 30% NaOH resistance | 1 | 1 | 1 |

The films obtained from the aqueous emulsion of epoxy resin of my invention were "best" in 10 or 12 tests and close to the best in both of the remaining two.

It is to be noted that the emulsions of the examples can be inverted to make the epoxy resin the continuous phase. The epoxy resin can then be cured at room temperature upon the addition of a water insoluble amine.

By eliminating the need for "oven-baking" to cure the epoxy resin, the use of epoxy resin as the continuous phase of the emulsion makes the emulsions of my invention highly adaptable for coating large size articles and large immovable surfaces, such as interior walls, etc.

The use of emulsions of epoxy resins as described herein offers the advantage of controllable advancement of epoxy resin molecular weight. This is accomplished by adding an amine to the emulsion and heating. "B-staging" or increasing the molecular weight of the liquid epoxy resin is precisely controllable up to the point of a fusible solid. Heretofore, "mass effects," i.e., buildup of an exothermic condition, has made B-staging control difficult. The B-staging above described provides films which dry tack-free at room temperature (cf. Example XII).

Combinations and blends of the emulsions herein described with other emulsions are also contemplated. For example, these epoxy resin/water emulsions can be added to nitrile rubber emulsions to upgrade the heat, water and solvent resistance of films and binders made therefrom.

The uses of my epoxy emulsions are virtually limitless. Among the best applications are:

Coated abrasive binder;
Size for cloth;

Can coating;
Drum coating;
Stabilization of paper;
Paper base laminates;
Glass mat and preform binder;
Wash and wear treatment for cotton and wool;
Wood chip binder; and
Binder for paper used for battery separators.

More particularly, the epoxy resin emulsions have been found especially useful:

(1) As protective coatings, e.g., automobile primers. When mixed and ground with iron oxide, barytes and talc powders the emulsions produced primers roughly equivalent to commercial solvent containing primers;

(2) As unpigmented coatings on glass and steel. These emulsions have shown surprisingly outstanding resistance to solvent attack and excellent impact resistance;

(3) As binders for non-woven textiles. The emulsions have been sprayed into a loose unbonded web of randomly arranged cellulose acetate fibers and after curing in a forced air oven for one to six minutes at 375° F. have produced mats which could not easily be pulled apart, had a reasonably soft "hand" and were resistant to both water and dry cleaning solvents such as mineral spirits and perchloroethylene;

(4) As decorative coatings for bottles. A colored mixture consisting of 100 parts of an emulsion formulated as in Example I, two parts of Du Pont's Latyl Yellow YL dye, four parts of diethylene triamine, 50 parts water and 10 parts of a high formaldehyde to phenol resole were applied to a glass bottle by immersion or spraying and cured for 30 minutes at 150° C. The coated surface was found to be smooth, resistant to scratching and impervious to water; and (5) As an adhesive. The emulsions have been used to bind together two canvas strips, canvas and steel, and glass cloth and steel. Attempts to part the bonded materials indicated a bond of great strength had been formed.

What is claimed is:

1. An aqueous emulsion consisting essentially of an oil phase comprising epoxy resin having an epoxy equivalent greater than 1, a water phase and, as a protective colloid, a water-dispersible protein colloidally dispersed in the water phase.

2. An aqueous emulsion consisting essentially of an oil phase comprising a polyglycidyl ether of a polyhydric phenol, a water phase and as a protective colloid a water-dispersible protein colloidally dispersed in the water phase, the weight ratio of water-dispersible protein to the polyglycidyl ether of a polyhydric phenol being above approximately 0.19:1.

3. The aqueous emulsion claimed in claim 2 wherein the weight ratio of water-dispersible protein to the polyglycidyl ether of a polyhydric phenol is above approximately 0.23:1.

4. The aqueous emulsion claimed in claim 2 wherein the weight ratio of water-dispersible protein to the polyglycidyl ether of a polyhydric phenol is above 0.23:1 to about 2:1.

5. The aqueous emulsion claimed in claim 2 wherein the weight ratio of water-dispersible protein to the polyglycidyl ether of a polyhydric phenol is below about 10:1.

6. The aqueous emulsion of claim 2 wherein the polyglycidyl ether of a polyhydric phenol forms the continuous phase.

7. The aqueous emulsion of claim 2 wherein the polyglycidyl ether of a polyhydric phenol forms the dispersed phase.

8. The aqueous emulsion of claim 4 wherein the polyglycidyl ether of a polyhydric phenol forms the dispersed phase.

9. A curable aqueous epoxy resin emulsion consisting essentially of an oil phase comprising a polyglycidyl ether of a polyhydric phenol, a water phase, a water-dispersible protein colloidally dispersed in the water phase as a protective colloid and a hardener for said polyglycidyl ether of a polyhydric phenol.

10. A curable aqueous epoxy resin emulsion consisting essentially of an oil phase comprising a polyglycidyl ether of a polyhydric phenol, a water phase, a water-dispersible protein colloidally dispersed in the water phase as a protective colloid and an amount of urea sufficient to cure said polyglycidyl ether of a polyhydric phenol.

11. The curable aqueous epoxy resin emulsion claimed in claim 10 wherein urea is present in an amount of from about 6 to about 50 parts by weight per 100 parts by weight of the polyglycidyl ether of a polyhydric phenol.

12. A curable aqueous epoxy resin emulsion comprising an epoxy resin phase, a water phase, a water-dispersible protein colloidally dispersed in the water phase present in an amount of at least 0.19 part by weight per 1 part by weight epoxy resin, a hardener for said epoxy resin and per 100 parts by weight water-dispersible protein, above about 25 parts by weight of a water soluble methylol group-containing compound which is reactive through the methylol group thereon with the water-dispersible protein to render said protein nonwater-dispersible.

13. The emulsion claimed in claim 12 wherein the methylol group-containing compound is 2,4,6-tris(hydroxymethyl)phenol.

14. The emulsion claimed in claim 12 wherein the methylol group-containing compound is a phenol formaldehyde resole.

15. The emulsion claimed in claim 12 wherein the methylol group-containing compound is dimethylol melamine.

16. The emulsion claimed in claim 12 wherein the epoxy resin is a poly epoxide.

17. The emulsion claimed in claim 12 wherein the epoxy resin is the diglycidyl ether of dihydroxy diphenyl propane.

18. The emulsion claimed in claim 12 wherein the epoxy resin is the polyglycidyl ether of a polynuclear phenol formaldehyde novolac.

19. An aqueous curable epoxy resin composition containing as a hardener per 100 parts by weight of epoxy resin, from about 6 to about 50 parts by weight of urea.

20. Method for forming epoxy resin articles comprising the steps of emulsifying epoxy resin in water containing colloidally dispersed therein at least 0.19 part by weight of a water-dispersible protein per 1 part by weight epoxy resin, adding a hardener for the epoxy resin, adding an amount of a methylol group-containing compound reactive with said water-dispersible protein through the methylol groups thereon sufficient to render said water-dispersible protein non-water-dispersible, curing the epoxy resin, simultaneously rendering said water-dispersible protein non-water-dispersible.

21. Method for forming epoxy resin articles comprising the steps of emulsifying the polyglycidyl ether of a polyhydric phenol in water containing colloidally dispersed therein above about 0.23 part by weight of a water-dispersible protein, subsequently adding to the emulsion the hardener for said polyglycidyl ether of a polyhydric phenol and an amount of a methylol group-containing compound reactive with said water-dispersible protein through the methylol groups thereon sufficient to render said water-dispersible protein non-water-dispersible, applying said emulsion to a suitable substrate, curing said polyglycidyl ether of a polyhydric phenol, simultaneously reacting said methylol group-containing compound with said water-dispersible protein to render said water-dispersible protein non-water-dispersible.

22. Method claimed in claim 21 wherein the polyglycidyl ether of a polyhydric phenol forms the dispersed phase of the emulsion, the hardener is urea, the methylol group-containing compound is phenolic resin, and the substrate is hard and non-porous.

23. Method claimed in claim 21 wherein the polyglycidyl ether of a polyhydric phenol is a poly epoxide, the hardener is zinc fluoborate and the substrate is fibrous.

24. Method claimed in claim 21 wherein the polyglycidyl ether of a polyhydric phenol forms the continuous phase.

25. Method for B-staging epoxy resin comprising the steps of emulsifying the epoxy resin in water containing hardener and colloidally dispersed therein a water-dispersible protein present in an amount of at least 0.19 part by weight per 1 part by weight epoxy resin and gradually raising the temperatures of the emulsion, thereby controllably advancing the molecular weight of said epoxy resin.

References Cited in the file of this patent

UNITED STATES PATENTS 2,872,427    Schroeder _____ Feb. 3, 1959

OTHER REFERENCES

Schildknecht: "Polymer Processes," High Polymers, vol. X, pub. by Interscience Publishers Inc., New York (1956), page 452.

UNITED STATES PATENT OFFICE
CERTIFICATE OF CORRECTION

Patent No. 3,020,250                      February 6, 1962

Stanley Norwalk

It is hereby certified that error appears in the above numbered patent requiring correction and that the said Letters Patent should read as corrected below.

Column 1, line 51, before "in" insert -- result --; column 2, line 23, for "in" read -- is --; column 9, line 11, for "milk-liquid" read -- milk-like liquid --; line 52, for "50% ag." read -- 50% aq. --; line 67, for "-phenyl" read -- -phenol --; column 10, line 58, for "melamine" read -- urea --; line 67, for "urea" read -- melamine --; column 11, line 27, for "Flms" read -- Films --.

Signed and sealed this 23rd day of October 1962.

(SEAL)
Attest:

ERNEST W. SWIDER                            DAVID L. LADD
Attesting Officer                              Commissioner of Patents